United States Patent
Lisart et al.

[11] Patent Number: 5,978,915
[45] Date of Patent: *Nov. 2, 1999

[54] DEVICE FOR THE PROTECTION OF THE ACCESS TO MEMORY WORDS

[75] Inventors: Mathieu Lisart; Laurent Sourgen, both of Aix en Provence, France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 08/573,942

[22] Filed: Dec. 18, 1995

[30] Foreign Application Priority Data

Dec. 20, 1994 [FR] France ................................. 94 15347

[51] Int. Cl.⁶ ........................... G06F 11/00; G11C 17/00
[52] U.S. Cl. ........................ 713/200; 711/152; 711/163; 365/195
[58] Field of Search .................................. 395/186, 472, 395/479, 188.01, 187.01; 364/286.4, 918.7; 711/150, 151, 163; 365/195, 218

[56] References Cited

U.S. PATENT DOCUMENTS

| | | |
|---|---|---|
| 4,037,214 | 7/1977 | Birney et al. . |
| 4,038,645 | 7/1977 | Birney et al. . |
| 4,099,256 | 7/1978 | Drapper ................................. 364/900 |
| 4,390,968 | 6/1983 | Hennessy et al. . |
| 4,442,484 | 4/1984 | Childs, Jr. et al. . |
| 4,513,389 | 4/1985 | Devchoudhury . |
| 4,521,853 | 6/1985 | Guttag . |
| 4,590,552 | 5/1986 | Guttag . |
| 4,648,076 | 3/1987 | Schrenk ................................. 365/230 |
| 4,665,506 | 5/1987 | Cline . |
| 4,744,062 | 5/1988 | Nakamura et al. ..................... 365/228 |
| 5,226,006 | 7/1993 | Wang et al. ........................ 365/189.01 |
| 5,361,341 | 11/1994 | Sourgen et al. . |
| 5,384,749 | 1/1995 | Lisart et al. ........................ 365/230.01 |
| 5,513,337 | 4/1996 | Gillespie et al. ........................ 395/479 |
| 5,604,702 | 2/1997 | Tailliet ................................. 365/200 |

FOREIGN PATENT DOCUMENTS

| | | |
|---|---|---|
| 0416211 | 3/1991 | European Pat. Off. . |
| 2621409 | 7/1989 | France . |
| 2661532 | 10/1991 | France . |

OTHER PUBLICATIONS

IBM Technical Disclosure, vol. 15, No. 12, May 1973.

*Primary Examiner*—Robert W. Beausoliel, Jr.
*Assistant Examiner*—Scott T. Baderman
*Attorney, Agent, or Firm*—Gunster, Yoakley, Valdes-Fauli & Stewart, P.A.

[57] ABSTRACT

The access to memory words of an integrated circuit is protected by the creation of a decision table that receives addresses of instruction words and/or data words to be protected and that receives also addresses of the control bits of a control word assigned to a word to be protected. It can be shown that this mode of action provides greater security through the use of a decision table made in wired circuit form as well as greater flexibility through the programmable quality of the control words assigned to each memory word to be controlled.

41 Claims, 4 Drawing Sheets

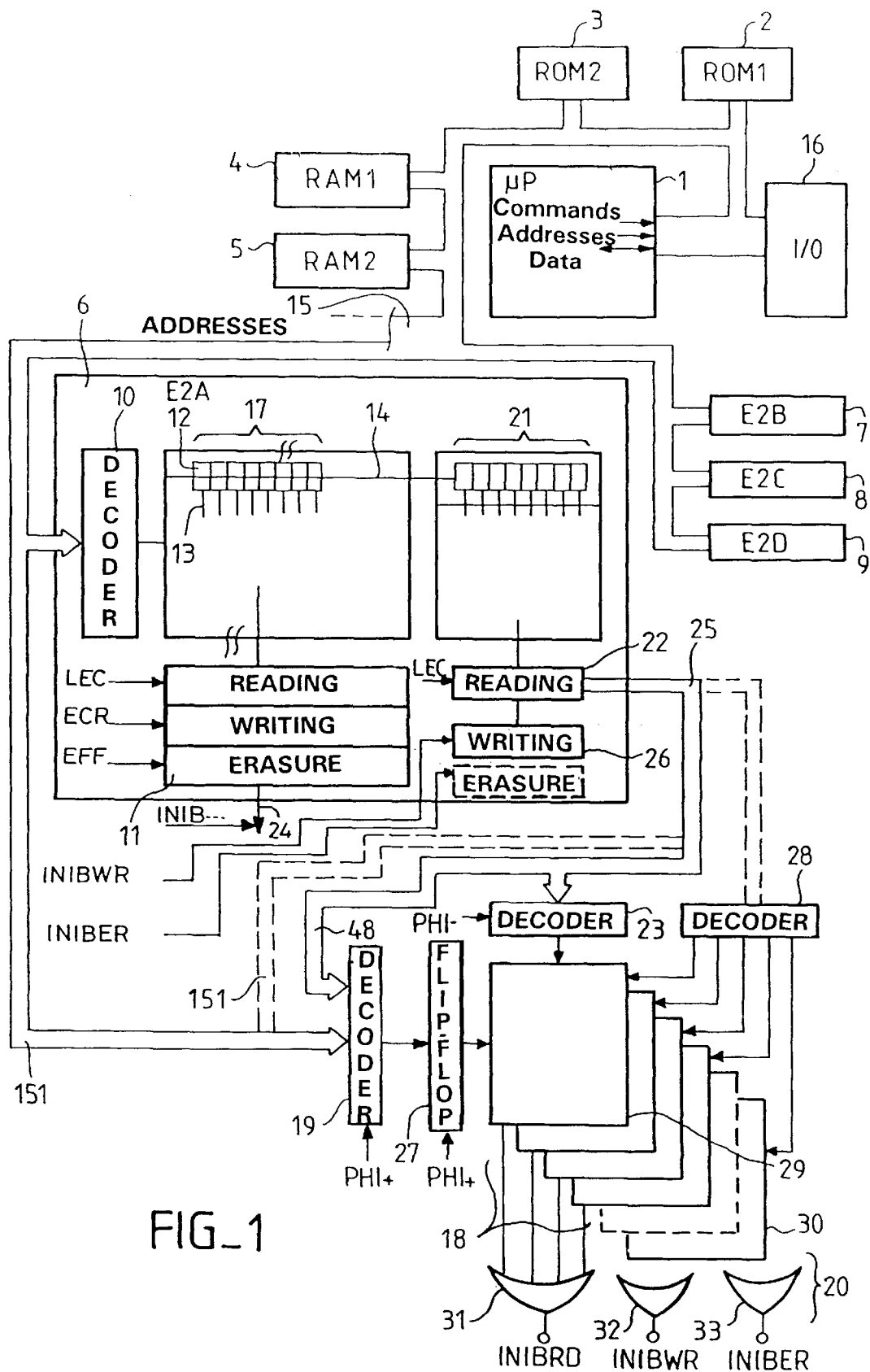
FIG_1

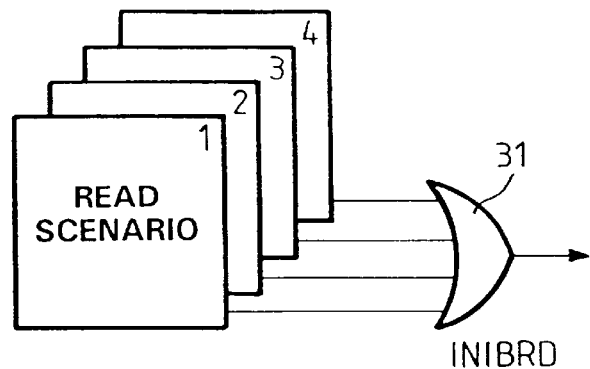
FIG_2a
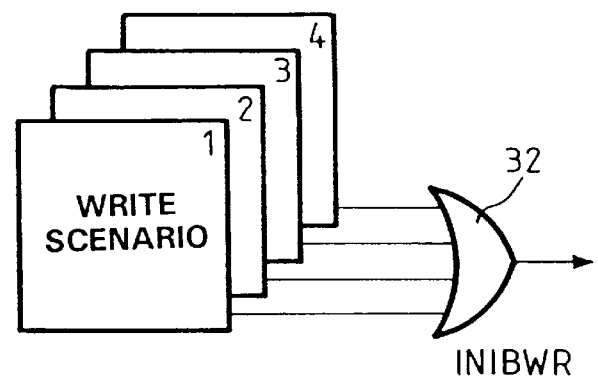
FIG_2b
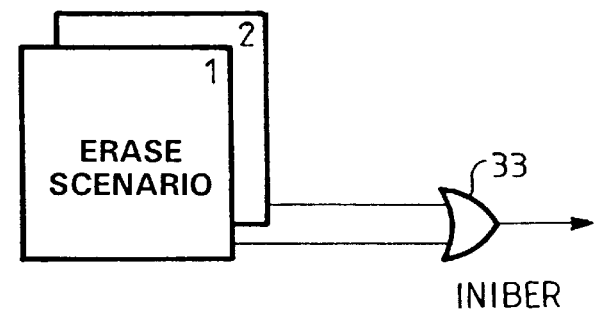
FIG_2c
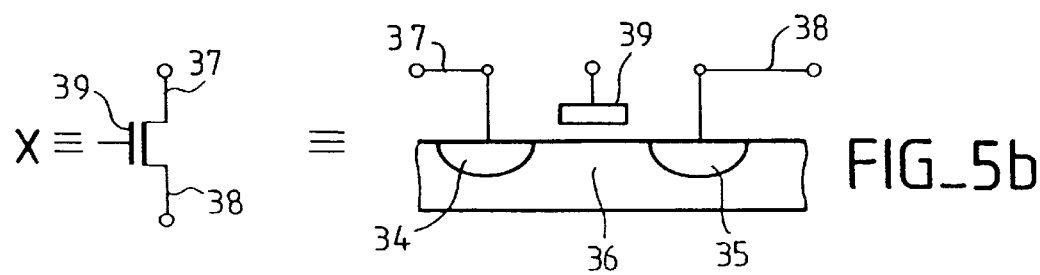
FIG_3
FIG_5b
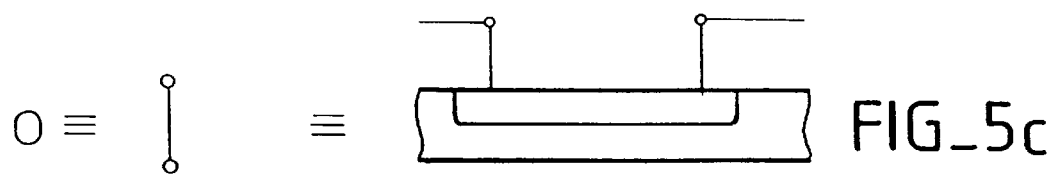
FIG_5c FIG_4a

| Destination \ Source | ROM1 | ROM2 | RAM1 | RAM2 | E2A | E2B | E2C |
|---|---|---|---|---|---|---|---|
| \multicolumn{8}{l}{SCENARIO 1 READING} |
| ROM1 | X | | | | | | |
| ROM2 | X | X | | | | | |
| RAM1 | X | X | | | X | X | X |
| RAM2 | X | X | X | | X | X | X |
| E2A | X | X | | X | X | | |
| E2B | X | X | X | | | X | |
| E2C | X | X | | X | | X | X |
| E2D | X | X | | X | X | X | X |

FIG_4b

| Destination \ Source | ROM1 | ROM2 | RAM1 | RAM2 | E2A | E2B | E2C |
|---|---|---|---|---|---|---|---|
| \multicolumn{8}{l}{SCENARIO 1 WRITING} |
| ROM1 | | | | | | | |
| ROM2 | | | | | | | |
| RAM1 | X | | | | X | X | X |
| RAM2 | X | X | X | | X | X | X |
| E2A | X | X | | X | X | | |
| E2B | X | | | | | | |
| E2C | | | | X | | | X |
| E2D | | | | X | X | X | X |

FIG_4c

| Destination \ Source | ROM1 | ROM2 | RAM1 | RAM2 | E2A | E2B | E2C |
|---|---|---|---|---|---|---|---|
| \multicolumn{8}{l}{SCENARIO 1 ERASURE} |
| ROM1 | | | | | | | |
| ROM2 | | | | | | | |
| RAM1 | | | | | | | |
| RAM2 | | | | | | | |
| E2A | X | X | | X | X | | |
| E2B | X | X | X | | | X | |
| E2C | X | X | | X | | | X |
| E2D | X | X | | X | | | |

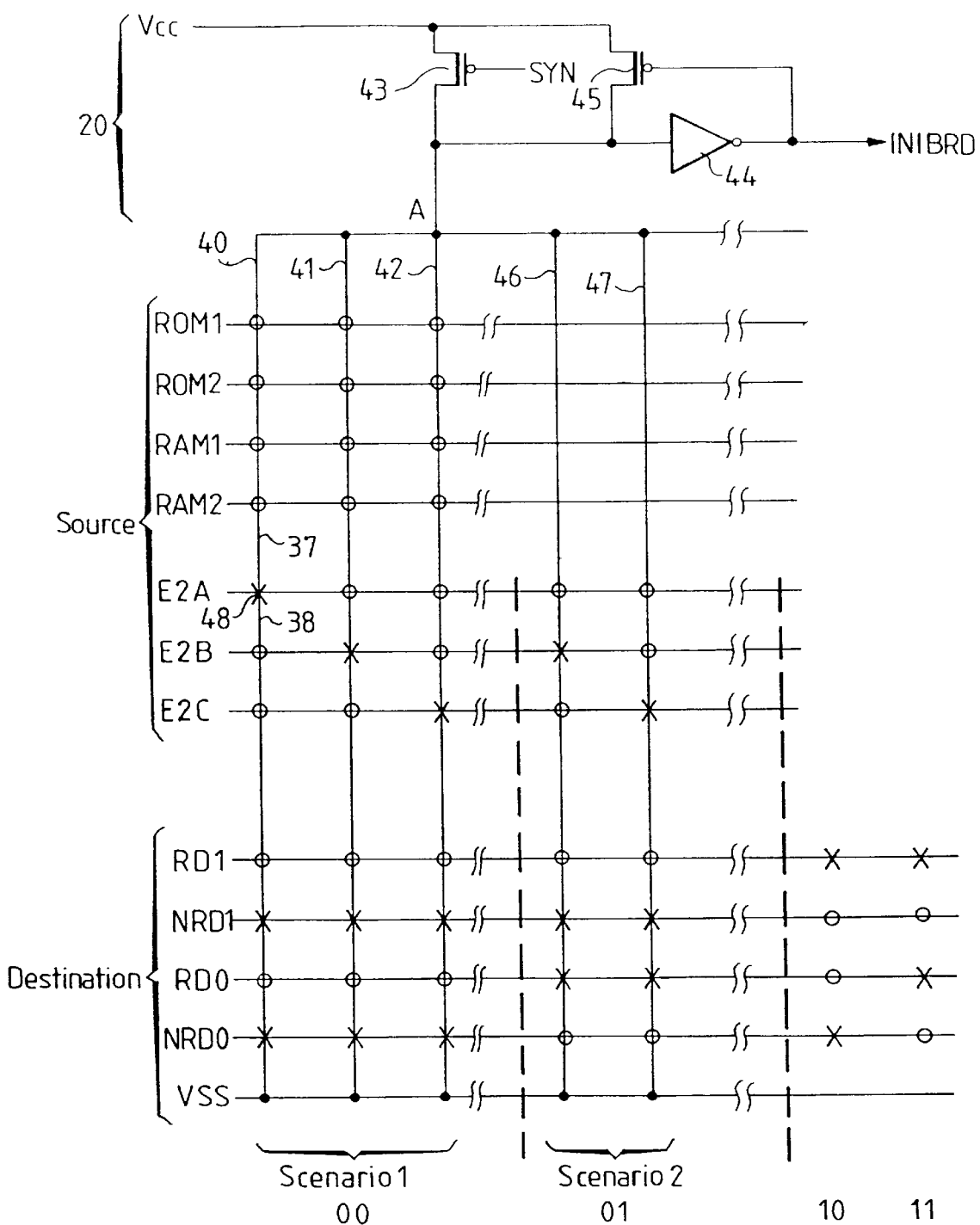
FIG_5a

DEVICE FOR THE PROTECTION OF THE ACCESS TO MEMORY WORDS

BACKGROUND OF THE INVENTION

1. Field of the Invention

An object of the present invention is a device for the protection of the access to memory words of a microprocessor-based system, especially a microprocessor-based integrated circuit. The invention relates more particularly to integrated circuit cards known as chip cards that can be used in banking, communications as well, and ever more frequently, in many other fields.

2. Description of the Prior Art

Microprocessor-based systems incorporated in integrated circuits go through many steps during their manufacture. In a first step, called a manufacturing step, the manufacturer of integrated circuits stores an operating system in program memories of this integrated circuit. This operating system enables the performance of a number of operations (consisting essentially of the writing, reading or erasure of the memory zones) as well as the limiting of certain other operations (especially in the case of bank type cards where it is known, at the very outset, that certain uses are prohibited). Once the integrated circuits have been manufactured, they are delivered to an organization, commonly called the issuing party. This issuing party puts them into service among its members (in the case of a bank they are its customers) after having programmed a program memory. Preferably, the integrated circuit is mounted on a card. Through the running of the corresponding instructions, the program contained in this program memory can provide for a particular use of the card. For example, the program could permit the withdrawal of cash from automatic cash dispensers. Another service could relate to the automatic constitution of a credit for certain privileged cardholders. Yet another service may entail the use of a card as an electronic wallet.

The diversity of these services and their gradual installation over a period of time implies strict management of the actions possible with the card. The gradual installation of services relates to the fact that, as a customer becomes more loyal, the issuing party, namely his bank, decides to provide him with new facilities, namely the use of new services. The gradual installation of services may also relate to the coexistence of applications of different types on one and the same chip card. For it is now accepted that the use of a single card to manage only one type of service (for example banking services) involves a cumbersome system and is furthermore impractical. By contrast, it would be more appropriate to insert several uses into one and the same card. For example, the holder's medical history could be recorded in the memories of the card to enable the use of his particulars when he goes to hospital.

The fact that different services exist together entails additional risks. It is important to prevent a situation where subsequent action to implement a new application permits the undue modification of previous applications or even the reading of an operational code governing another application. For example, certain information elements stored in the memories of the card must be permanently protected. These information elements relate of course to the secret code of the card which should not be modified or should be modified only under certain strict conditions. They also relate to particulars for the identification of the card such as its series number, its class of membership in a cryptographic system, etc. However, the information that should not be modified, disturbed or read may also relate to the program memories, especially those containing the operating system of the card. However true it is that certain information elements stored in the card are, from the very outset, information elements that should be preserved, it is also a fact that some of them become so only gradually, when the card is used for another application. They may even become so only partially, their modification being hedged in by a certain number of restrictive conditions.

To resolve the problems of security inherent in this development, there is a known way of assigning each memory word to be protected a protection code pertaining to its ability to be read, written or erased. When such a memory word is accessed, its protection code is read simultaneously and the action envisaged is permitted or not permitted depending on this code. This type of approach has the following drawbacks.

Firstly, it is not flexible. Indeed, it may be desired to permit a given action, for example the action of reading, under certain conditions and not under other conditions. Since the only possibility open is that of permitting or of prohibiting the read operation, it is impossible to use this code for this purpose. Secondly, the fact of assigning a control word to each memory word entails penalties in terms of occupation of the memory. Since the control word has at least one eight-bit byte, the storage capacities of the memory are proportionally reduced. Finally, and above all, this system has the drawback wherein its implementation is done by software means.

The microprocessor indeed receives the bits of this control word and must normally take account of them to permit or prohibit action. This mode of operation however is related to the consistency with which these control words are taken into account. Through error or fraud, it is possible that these words will not be taken into account and that the system will lose all its security.

To resolve this type of problem, the Applicant has filed a French patent application on Oct. 2, 1987 bearing the number 87 13936 and published under No. 2 621 409, recommending a different operation. In order to increase its flexibility, it was noted that the character of certain memory words, whether usable or unusable, was related to the processing instruction to which this word was to be subjected. For example, a reading of the secret code of the card and its transfer in one form or another to a register of the microprocessor has to be authorized. Indeed, when the comparison is made with a secret code typed in at a keyboard by a user, the secret code of the card must be available in order to make the comparison. However, the reading and the display of this secret code on the screen of a terminal must be prohibited. Consequently, the reading of the code is permitted in certain cases (for comparison) and not in others (for display).

The system described in this patent application makes use of the fact that a microprocessor works essentially by the application of an instruction (an instruction code) to data elements. The idea that came up then was to make a decision table or matrix receiving an address of an instruction or of an instruction code as a first input and an address of a data element to be processed by this instruction as a second input. In view of the fact that all the addresses could not be sent simultaneously, it was appropriate, besides, to temporarily store the address of the instruction (or of the data element), more precisely of the operational code of the instruction (or of the operand for the data element) in order to present it at the right time to the decision table. This being done, the table receiving these two address signals at input delivered a signal to permit or prohibit the performance of the instruction on the data element. The particular feature of the decision table of this patent application was that it was made in the form of a circuit, preferably non-modifiable, at least after the first stages of manufacture. In this way, the three problems referred to here above were resolved.

SUMMARY OF THE INVENTION

However, although this approach is very efficient, its flexibility of use is still inadequate. Indeed, the unchangeable character of the decision table (notably because it is made by mask) gives it security and at the same time makes it impossible to change. The present invention will improve flexibility while at the same time preserving the solid character of the security. This solid character is related to the fact that the table is made in the form of a wired circuit (possibly programmable at the time of manufacture), the working of which is particularly reliable because it can no longer be misused.

In the invention, the addressing of the table with addresses is complemented by an addressing with information elements contained in control words associated with words to be protected. These words set the parameters of the table used. In practice, a term selected in the table (and therefore the signal that it produces) depend firstly on the address (or addresses) of the instruction and/or of the word to be protected, and of the control bits contained in a control word assigned to this word to be protected. According to the value of these bits, it is possible to choose one sub-table or another in a set of sub-tables leading to the defining of several possible protection scenarios. Preferably, a hierarchy of protection scenarios is even established. The initial scenario, corresponding to a control word that is the most permissive one, enables more operations on the different words than a subsequent scenario. The control word will then preferably comprise means so that it can thereafter develop only in a direction that increasingly restricts its permissive character. The desired flexibility is availed of through the assigning of desired control words to new data elements created in the system. Furthermore, for the former control words, it is chosen not to have the ability to make them develop except towards greater restrictiveness.

An object of the invention therefore is a device for protecting the access to memory words of a microprocessor-based integrated circuit comprising:

a microprocessor, a set of memory words comprising these words, a bus for the transmission of data, addresses and commands between this microprocessor and these memories, a circuit to protect the access to these memory words provided with a decision table, circuits for the addressing of this table with addresses of these memory words and an authorization circuit to produce a protection signal as a function of the reading of the table, wherein said device comprises:

a set of control bits assigned to certain words to be protected, a circuit to read these control bits at the time of the reading of these words, and a circuit to address the decision table as a function of the value of the bits read, and corresponding to a mode of protection of these words.

BRIEF DESCRIPTION OF THE DRAWINGS

The invention will be understood more clearly from the following description and from the figures that accompany it. These figures are given purely by way of an indication and in no way restrict the scope of the invention. Of these figures:

FIG. 1 shows a protection device according to the invention;

FIGS. 2a to 2c show a schematic view of the different types of scenarios that can be envisaged in the invention;

FIG. 3 is a preferred representation of a control word in the form of a byte;

FIGS. 4a to 4c show detailed views of exemplary scenarios that can be used;

FIGS. 5a to 5c show practical modes of making the decision table of the invention.

MORE DETAILED DESCRIPTION

FIG. 1 shows a device for the protection of access to the memory words of a microprocessor-based integrated circuit. The integrated circuit preferably has all the elements shown in FIG. 1. This integrated circuit essentially has a microprocessor 1 and a set of memories 2 to 9. The memory 2 and the memory 3 are, for example, random-access memories that can only be read. They are used, for example, for the storage, respectively, of the instructions of the operating system of the microprocessor and the instructions of a main application, for example a banking application. They are, in principle, non-volatile memories. They may be programmed at the outset by mask or by a specific operation that can be launched only once.

The memories 4 and 5 are volatile high-speed memories that can be used especially for the temporary storage of instructions or data elements. They are the high-speed, working storage memories of the microprocessor. They are random-access memories. The memory 4 may be designed to store system instructions, the memory 5 possibly being designed to store instructions or data elements of the application. The memories 6 to 8 are electrically erasable and programmable, non-volatile random-access memories. The memory 9 of the same type is, for example, not erasable. In the example, the memories 6 to 9 are made with a standard EEPROM type or flash EEPROM type technology. That is, they are made with memory cells comprising a floating-gate transistor. They may be made however in the form of an EPROM type memory that is only electrically recordable.

In one example, the memories 6 to 8 will contain sets of instructions designed respectively for different applications such as automatic cash withdrawals, the furnishing of automatic credits or the counting out of units in an electronic wallet. The memory 9 could be dedicated to data. In practice, the memories 6 to 9 may have different technologies, topographies and sizes. They may however also be made in one and the same memory array and may be differentiated from one another by a partition, which may be, particularly but not solely an addressing partition. For example, without this being obligatory, two control word bits of this memory provide information by their value of 0 to 3 on the memory zones E2D and E2A to E2C respectively to which they belong. In this case, the sizes of these same memory zones are defined by a number of word lines assigned the same control bits. Furthermore, the word lines of a zone are not necessarily contiguous. Within the zones E2A to E2D, there are sub-groups where all the control bytes of the sub-group together define one and the same mode of management of the memory words of the sub-group as regards their access in read, write or erasing mode.

Each memory described here above comprises, as shown solely for the memory 6 E2A, an access decoder 10 receiving address signals and read/write/erasure circuits 11. The memory cells 12 of this memory are located at the intersection of the bit lines 13 and the word lines 14 connected to this decoder and to this circuit 11.

The device of the invention also has a bus 15 for the transmission of data, addresses and commands between the microprocessor 1 and its memories 2 to 9. The transmission bus may also be connected to an input/output peripheral 16 whose management may furthermore be provided by the microprocessor 1 or by an external microprocessor.

According to the French patent application referred to here above, the circuit for the protection of access to the memory words 17 of the integrated circuit comprises a decision table 18 and addressing circuits 19 to address this table with addresses of these memory words. These addresses are transmitted by the address bus 151 to the table 18. Depending on the addressing done, the decision table 18 produces signals that are combined in a protection circuit 20 to produce a protection signal.

According to the invention, certain words to be protected, for example the word 17 in the memory 6, are assigned a set 21 of control bits. A read circuit 22 enables the reading of these control bits at the instant of (slightly before, slightly after or normally during) the access to this word 17. The read circuit 22 delivers read signals to an addressing circuit 23 to address the decision table 18 as a function of the value of the bits read which correspond to a mode of protection of these words. Ultimately, the protection signal produced by the decision circuit 18 depends not only on the addresses of the operational codes but also on the mode of protection represented by the control word 21 which is assigned to the words to be protected.

To simplify the operations, the following structure is chosen as the architecture for the memories 6 to 9 (the same structure, besides, could be used for the memories 2 and 3 and even for the memories 4 and 5). The words to be protected 17 can be accessed by bit lines 13 and word lines 14. Preferably, it is chosen to protect a word 17 by a word 21 which is placed firstly in the same memory and secondly on the same word line as the word to be protected. It could have been planned to place all the words 21 in a different memory. However, by acting in this way, advantage is taken of the decoding of the word lines inherent in the word to be protected in order to obtain access, at the same time, to the control word of this word. The read circuit 22 may even be combined with the read/write/erasure circuit 11 of the main part of the memory.

In one example, in a memory, there are sixteen eight-bit words per word line. Fifteen words are used to store information elements to be protected, a sixteenth word being designed to store the control bits. In such a memory, there is a read/write/erasure amplifier at the end of each bit line. At the time of the decoding, it is only the read amplifiers of the eight cells selected in read mode that are connected to the data bus 24. The same is done in writing or erasure mode. In the invention, there is an additional data bus 25 that routinely conveys the control bits to the decision table 18. In practice, the bus 25 herein has eight wires. The read amplifiers of the eight bit lines associated with this control word are put into operation, at each access, whatever may be the information word accessed on one and the same word line.

This way of proceeding has the consequence wherein several words, those located on the word line 14, will be assigned one and the same mode of protection corresponding to the word 21. This procedure leads to an efficient compromise between the greatest possible flexibility and the shortest possible occupation of memory for the control words. The fact of assembling the words belonging to one and the same line 14 with one and the same mode of protection combined with the fact that the control word is itself placed on this word line, for example at the end (but this is not obligatory) leads to a particularly clever solution. As shall be seen hereinafter, the memory 6 may comprise circuits 26 for the writing (preferably, the final user will not be allowed to make erasures) of the control word 21 under certain conditions.

As a variant, and depending on the required complexity of the constitution of the table 18, it can be chosen to access this table 18 according to the system described in the above-mentioned patent application. In this case, the address of the instruction code sent beforehand and decoded in the decoder 19 is stored in a set of flip-flop circuits 27 connected to the input of the table 18. The address bus is then connected by the decoder 23 to another address input of the table 18 to decode the address of the word to be protected. The connection (shown in dashes) of the bus 151 shows this possibility. In this case, the bits of the control word available at the bus 25 are sent to an additional decoder 28 that enables the choice, in the table 18, of one sub-table out of the possible sub-tables 29 to 30. These sub-tables enable the defining of the different modes of protection. In practice, all the sub-tables may be integrated with one and the same table 18 which, in this case, would have a greater number of selection inputs.

FIG. 3 shows a preferred shape of a control word according to the invention. This control word has a byte. Two of its bits, for example the two first bits referenced EX1 and EX0, enable the definition of four situations. When they are equal to 00, it means that the information elements contained in the words controlled by this control word are data elements. If they are equal to 01, 10 or 11, it will mean that the word controlled by this control word is an instruction belonging to the memories 6 to 8 respectively. In practice, these two bits may thus constitute, entirely or partially, the general address of the instructions in the memories 6 to 9 respectively. In the latter case, these bits furthermore enable the defining, in a single memory 6–9, of partitions having different sizes as referred to here above. Furthermore, these sizes may change with time. It is enough to program these bits EX1 and EX0 in good time with the desired values.

Two following bits, for example the bits RD1 and RD0, enable the defining of four scenarios in read mode. Two other bits WR1 and WR0 enable the defining of four scenarios in write mode. Finally, one bit ER enables the defining of two scenarios in erasure mode.

FIGS. 2a to 2c give a schematic view of the fact that decision sub-tables corresponding to the four read scenarios, the four write scenarios or the two erasure scenarios deliver signals in OR gates 31 to 33 respectively. These gates, by a single signal, permit or prohibit the planned action. Thus, preferably, the integrated circuit of the invention will produce (FIG. 1) three signals that represent prohibition or permission. These are the signals INIBRD, INIBWR and INIBER. So as to prevent any misuse, the signals INIBRD, INIBWR and INIBER will be conveyed by direct connections to the elements of the integrated circuits that they control. They will not be processed or interpreted by the microprocessor 1.

FIGS. 4a to 4c give a schematic view in matrix form of the read, write and erasure scenarios respectively.

FIG. 4a shows the read scenario 1. On the top line there are designated, as sources, the possible locations of origin of the instruction codes. Vertically, the matrix designates, as points of destination, the memories that store the data elements and are liable to be subjected to the action (read action pertaining to the scenario) coming from a source. The rows and columns of the matrices intersect at places where the desired consequences are shown. The presence of crosses at the intersections means that the action is permitted; The absence of crosses means that it is prohibited. Thus, a read instruction (since the scenario concerned is a read scenario) coming from the memory ROM1 could be carried out on the contents of the memory ROM1 itself. This is understandable in order that the system may be capable of working. Similarly, the read instructions coming from ROM1, which are system type instructions, are applicable to all the memories ROM2, RAM1, RAM2 up to E2D.

By contrast, since the memory concerned is the memory ROM2 (second column), it can be assumed that it is possible that its read instructions are not applicable to the contents of the memory ROM1. It is not possible to read the operating system of the integrated circuit with one application. And so on and so forth. Special emphasis has been placed on the instructions coming from the read memory E2B that enable the reading, inter alia, of the memories E2B, E2C and E2D but not the memory E2A. This set is a protection scenario. According to what has been stated here above, it is possible to define three other protection scenarios which, depending on their rank with respect to the scenario presented, could show varying degrees of possibility.

FIG. 4b shows the same elements with regard to the writing. Quite naturally, it is not possible to write in ROM-type memories. The meaning of the column E2A is that, with an instruction coming from the zone E2A, it is possible firstly to write in the random-access memory RAM1 or the central random-access memory RAM2 in order to make the microprocessor, in a following cycle, carry out the instructions thus loaded into its central memories. But it also may be desired, because the system is in the process of incorporating a new application in the program memory of the integrated circuit, to program and therefore write in the memory E2A itself or the memory E2D. When it is desired to write in the memory E2A, it will be necessary to choose the memory words of the memory comprising, in the associated control word, the appropriate bits EX1 and EX0 and WR1 and WR0. Here too, there are four possible write scenarios.

FIG. 4c shows an erasure scenario in which, in practice, each memory 6 to 8 is capable of erasing only its own words. The memory words of the memory E2D are erasable only through instructions coming from the memories ROM1, ROM2 or RAM2.

FIG. 5a shows a way of making the decision table 18 especially for the part relating to the zone boxed in bold lines in FIG. 4a. The operation is as follows. The address of an instruction taken from any of the memories 2 to 9 is applied by the decoder 19 to the set of flip-flop circuits 27 at input of the circuit 18. To simplify matters, it shall be assumed that there is only one possible address per type of source memory. It would be possible however, in the decoder 19, to provide for as many lines as there are address bits possible. The decoder 19, and hence the set of flip-flop circuits 27, produce a set of source signals, at the input to the table 18, representing the source of the instruction concerned. In practice, only one of the outputs of the set of flip-flop circuits 27 is in the active state, for example 5 volts in positive logic, the others being in the state 0.

At a following or previous cycle or at the same time, the address bus selects a word 17 through a decoder 10 of one of the memories 2 to 9. To simplify the explanation, it shall be assumed that this word is read on the basis of a read command LEC received by the control bus connected to the microprocessor 1. It shall be assumed that the prevention of reading consists in preventing the word read from being transmitted on the data bus 24. The read command LEC at the same time activates the read circuit 22 to read the control word 21 assigned to the memory word 17. The read circuit 22, in combination with the decoder 23, produces the signals RD1 and RD0 read. In the decoder 23, it is possible, with inverters, to convert the signals RD1 and RD0 into signals RD1 and NRD1 and RD0 and NRD0 respectively. These four signals are then available in the input of the decision table 18 which corresponds to the decoder 23. They are called destination signals in FIG. 5a.

The circuit shown in FIG. 5a has a set of column connections intersecting a set of row connections. At the intersections of these rows and columns, there are shown crosses and circles respectively. The crosses represent transistors for which FIG. 5b gives a representation that is on the one hand theoretical and on the other hand real with diffused zones in a substrate. The drain 34 and the source 35 of these transistors, together with the conduction channel 36, provide for the electrical continuity of the column links. For example, an upline link 37 is connected to a connection oriented towards the top of the column, while the other link 38 is connected to a connection oriented towards the bottom. At the position where there are small circles, the connection is permanent. There is no transistor conduction channel, and the drain and the source of the transistor are mixed. A structure such as the one shown in FIG. 5c is present at the position of these circles. It is obtained, when the source and drain regions of the integrated circuit are implanted at positions where there is no prior operation for the making, by masking, of a control gate 39 in a raised position. The existing gates 39 are connected to the row connections which go over them on the integrated circuit. The vertical connection 40 shown in FIG. 5a thus connects a node A to the ground VSS. It goes in particular through a transistor 48 of the type shown in FIG. 5b controlled by a signal coming from the activation of an address E2A and by transistors that respectively receive the active signals NRD1 and NRD0.

In practice, these two active signals mean that the bits RD1 and RD0 are zero and zero: they define the first scenario. In other words, the word protected by the control word has chosen the first scenario as the mode of protection in read mode.

The column 41 connected under the same conditions between the node A and the ground VSS has a transistor facing the memory address E2B. Similarly, the column 42 has a transistor facing the memory address E2C. This means, if the analysis is limited to the situation as described, that the words capable of being protected by the scenario 1 can be read only by an instruction coming from the memories E2A, E2B or E2C respectively. The scenario however is more ample. In particular, several column connections of the same type are added in the same scenario, these column connections comprising a transistor facing the source concerned. There are as many column connections added as there are sources possible.

The read circuit 20 of the decision table 18, in one example, has a P type transistor 43 connected by drain and source between the supply potential VCC of the integrated circuit and the node A. This transistor 43 is controlled from time to time by a synchronization signal SYN to prevent the consumption from taking place permanently. The node A is furthermore connected to the input of an inverter 44 whose output firstly delivers the inhibition signal INIBRD and secondly is connected to the control gate of a P type transistor 45. The transistor 45 is connected by drain and source between VCC and the input of the inverter 44.

The table 18 works as follows. When the signals NRD1 and NRD0 are at 1 and when one of the memory addresses E2A to E2C has been decoded, one of the paths 40 to 42 short circuits the node A at the ground. In these circumstances, the transistor 43, which is highly resistive, lets through current and the potential of the node A falls. The signal INIBRD rises to 1. Reading is permitted. On the contrary, if none of the connections 40 to 42 sets up a path between A and the ground, the node A is at the high level and the signal INIBRD equals 0. There will be no right to read.

The scenario 1 may be complemented by an additional set of connections with appropriate structures of transistors at the desired places. The circuit corresponding to the read scenario 2 defined for signals RD1, RD0, equal to 0 and 1 respectively, is of the same type. Its restricted character, as compared with the scenario 1, is physically expressed by the fact that it has a linking path 46 between the point A and the ground that is identical, for the source part, to the path 41 and a path 47 that is identical, under the same conditions, to the path 42. On the contrary, it has no path identical to the path 40. The restrictive character is therefore expressed physically by a smaller number of connections and, for the existing connections, by the fact that it is shaped identically to a scenario having a higher hierarchical rank. Of course, it is not obligatory to choose a hierarchical mode of this kind but, for reasons of security, its utility will be understood. For the scenarios 3 and 4 controlled by the signals RD1 and RD0 equal to 10 and 11 respectively, a similar line of reasoning is applied. It will be noted that the OR gate 31 is made simply by having only one node A for all the scenarios.

The scenario 1 thus shown in read mode is quite transposable to the case of writing or even that of erasure. All that needs to be done is to replace the RD signal inputs by WR signal inputs or ER signal inputs respectively. Should it be necessary to prohibit the reading, the signal INIBRID will be quite simply applied directly to an input for validating the connection of the read circuit 11 to the data bus 24.

The working of the decision table 18 in the case of the variant leads to the modification of this variant for the introduction into this decision table, for example in a mean position between the source information elements and the destination information elements, of the row connections pertaining to the addresses in the memories 2 to 9 of the memory words to be accessed. At the intersections of these horizontal connections with the vertical connections such as 40 to 41 and 46 and 47, transistors such as that of FIG. 5b may or may not be placed.

In the version described however, the rows E2A to E2C of the decision table 18 of FIG. 5a receive signals corresponding to the decoding of the bits EX0 and EX1 of the control word. For the decoding of the two bits EX0 and EX1, the processing is as follows. A word is addressed in a memory 6 to 9. If the two bits EX0 and EX1 of its control word are 00, there is a data element, and then the other bits RD1, RD0, WR1, WR0 and ER are sent to the decoder 23 to define the mode of protection. If these two bits EX0 and EX1 are 01, 10 or 11, they are sent to the decoder 19. At the next cycle, their translation is introduced into the set of flip-flop circuits 27 at the same time as the control bits of a following word to be protected (normally a data element) reaches the decoder 23, this word to be protected being a word to which, in any case, the instruction read in the previous cycle must be applied. FIG. 5a shows the link 48 of the bus 25 to the decoder 19 to convey, in this case, these two bits EX0 and EX1. If the word to which the instruction code read in a previous cycle has to be applied is a word of a memory E2A to E2C (this means that this word is in principle itself an instruction operational code), this word can be read, written or erased as a function of the mode of protection to which it is subjected by the control word assigned to it.

For the modification of the control word itself, the write circuit 26 is driven by a write inhibition signal INIBWR produced by the decision table 18. It is then easy to modify a control word itself. The fact of not being able to erase the control word in itself leads to a situation where these bits can develop only towards one state, namely the programmed state. Thus, the irreversible development of the permissive character referred to here above is achieved. However, this faculty may be abandoned, especially for programming operations performed by the issuing party. In this case, the circuit 26 has an erasure circuit.

What is claimed is:

1. A device for protecting access to memory words of a microprocessor-based integrated circuit, said device comprising:

a microprocessor;

a set of memories containing memory words to be protected;

a bus for transmission of data, addresses, and commands between said microprocessor and said memories;

a set of control bits assigned to said memory words to be protected;

a circuit to read at least some of said control bits at the time of reading of said memory words; and a circuit to protect access to said memory words to be protected using a physical decision table, said decision table being accessed as a function of the value of addresses of said memory words to be protected and said control bits read, said circuit to protect access producing a protection signal in accordance with values stored in and retrieved from said decision table.

2. A device according to claim 1, wherein:

said memories comprise bit lines and word lines and wherein said control bits assigned to a word are memorized in memory cells placed on a same word line as respective memory cells of said word to be protected.

3. A device according to claim 1 wherein:

said memories comprise bit lines and word lines and wherein:

several words located on one and the same word line are access protected according to a mode defined by one of said control bits.

4. A device according to claim 1 wherein:

said decision table comprises three sub-tables to respectively produce read, write and erase protection signals.

5. A device according to claim 1 wherein:

an addressing circuit of said table comprises circuits to receive an address of a first word, an address of a second word and said control bits.

6. A device according to claim 1 wherein:

the set of said memories containing said words to be protected is made in the form of a block of memory words and wherein:

the address of a word used to address said decision table comprises bits of said control word assigned to a respective word to be protected and to be accessed.

7. A device according to claim 1 wherein:

said set of memories is divided into memory blocks that are physically differentiated on said integrated circuit, and wherein the address of a word used to address said decision table is constituted by address bits of said memory blocks.

8. A device according to claim 1 wherein:

said control bits comprise bits pertaining to an instruction character of said word to be protected, its ability to be read, written or erased, or to the modifiable character of these control bits themselves.

9. A device according to claim 8, wherein:

said memories comprise a circuit for the modification of said control bits whose operation is conditioned by said protection signal.

10. A device according to claim 2, wherein:

said memories comprise bit lines and word lines and wherein:

several words located on the same one of said word lines are access protected according to a mode defined by a respective one of said control bits.

11. A device according to claim 2, wherein:

said decision table comprises three sub-tables to respectively produce read, write and erase protection signals.

12. A device according to claim 3, wherein:

said decision table comprises three sub-tables to respectively produce read, write and erase protection signals.

13. A device according to claim 2, wherein:

an addressing circuit of said table comprises circuits to receive an address of a first word, an address of a second word and said control bits.

14. A device according to claim 3, wherein:

an addressing circuit of said table comprises circuits to receive an address of a first word, an address of a second word and said control bits.

15. A device according to claim 4, wherein:

an addressing circuit of said table comprises circuits to receive an address of a first word, an address of a second word and said control bits.

16. A device according to claim 2, wherein:

said set of the memories containing said words to be protected is made in the form of a block of memory words, and wherein:

the address of a word used to address the decision table comprises bits of a respective control word assigned to a word to be protected and to be accessed.

17. A device according to claim 3, wherein:

said set of memories containing said words to be protected is made in the form of a block of memory words, and wherein:

an address of a word used to address said decision table comprises bits of a respective control word assigned to a word to be protected and to be accessed.

18. A device according to claim 4, wherein:

said set of the] memories containing said words to be protected is made in the form of a block of memory words, and wherein:

an address of a word used to address said decision table comprises bits of a respective control word assigned to a word to be protected and to be accessed.

19. A device according to claim 5, wherein:

said set of the memories containing said words to be protected is made in the form of a block of memory words, and wherein:

an address of a word used to address said decision table comprises bits of a respective control word assigned to a word to be protected and to be accessed.

20. A device according to claim 2, wherein:

said set of memories is divided into memory blocks that are physically differentiated on said integrated circuit, and wherein an address of a word used to address said decision table is constituted by address bits of said memory blocks.

21. A device according to claim 3, wherein:

said set of memories is divided into memory blocks that are physically differentiated on said integrated circuit, and wherein an address of a word used to address said decision table is constituted by address bits of said memory blocks.

22. A device according to claim 4, wherein:

said set of memories is divided into memory blocks that are physically differentiated on said integrated circuit, and wherein an address of a word used to address said decision table is constituted by address bits of said memory blocks.

23. A device according to claim 5, wherein:

said set of memories is divided into memory blocks that are physically differentiated on said integrated circuit, and wherein an address of a word used to address said decision table is constituted by address bits of said memory blocks.

24. A device according to claim 6, wherein:

said set of memories is divided into memory blocks that are physically differentiated on said integrated circuit, and wherein an address of a word used to address said decision table is constituted by address bits of said memory blocks.

25. A device according to claim 2, wherein:

said control bits comprise bits pertaining to an instruction character of said word to be protected, its ability to be read, written or erased, or to a modifiable character of said control bits.

26. A device according to claim 3, wherein:

control bits comprise bits pertaining to an instruction character of said word to be protected, its ability to be read, written or erased, or to a modifiable character of said control bits.

27. A device according to claim 4, wherein:

said control bits comprise bits pertaining to an instruction character of said word to be protected, its ability to be read, written or erased, or to a modifiable character of said control bits.

28. A device according to claim 5, wherein:

said control bits comprise bits pertaining to an instruction character of said word to be protected, its ability to be read, written or erased, or to a modifiable character of said control bits.

29. A device according to claim 6, wherein:

said control bits comprise bits pertaining to an instruction character of said word to be protected, its ability to be read, written or erased, or to a modifiable character of these control bits.

30. A device according to claim 7, wherein:

said control bits comprise bits pertaining to an instruction character of said word to be protected, its ability to be read, written or erased, or to a modifiable character of said control bits.

31. The device according to claim 1, wherein the decision table is also accessed as a function of the type of instruction, and the type of instruction is either read or program, the program type including write and erase.

32. The device according to claim 1, wherein the decision table is also accessed as a function of the address at which an instruction is stored.

33. The device according to claim 1, wherein the decision table includes a plurality of subtables, and the circuit to protect access chooses one of the subtables of the decision table based on the control bits read.

34. The device according to claim 1, wherein the decision table is hardwired so as to be unchangeable after manufacture of the device.

35. An integrated circuit comprising:

a microprocessor;

a plurality of memory portions connected to be accessible by said microprocessor, wherein at least some of said memory portions include multiple rows of memory cells, each said row including control bits as well as data bits; and access control logic which includes a plurality of access control tables, the access control logic using values stored in the access control tables for permitting or denying access for each requested access, in dependence on:

which memory portion is the source of the access request;

which memory portion is targeted by the access request;

which access control scenario is indicated by said control bits stored with said data bits in said memory portion; and whether the requested access is a read, write, or erase operation.

36. The integrated circuit of claim 35, wherein said memory portions include read only memory, volatile random access memory, and at least one erasable floating-gate nonvolatile memory portion.

37. The integrated circuit according to claim 35, wherein the access control logic chooses one of the access control tables based on the control bits stored with said data bits.

38. An integrated circuit comprising:

a microprocessor;

a plurality of memory portions connected to be accessible by said microprocessor, wherein said memory portions include read only memory, volatile random access memory, and at least one erasable floating-gate nonvolatile memory portion, and wherein at least some of said memory portions include multiple rows of memory cells, each said row including control bits as well as data bits; and access control logic which includes a plurality of access control tables that are physically stored on the integrated circuit, the access control logic using values stored in and retrieved from the access control tables for permitting or denying access to said memory portions, the values being retrieved from the access control tables in dependence on the address of said data bits which are being acted on and the value of at least one of said control bits stored on the same row as said data bits which are being acted on.

39. The integrated circuit according to claim 38, wherein the access control logic permits or denies access to the memory portions also in dependence on the type of instruction, and the type of instruction is either read, write, or erase.

40. The integrated circuit according to claim 38, wherein the access control logic permits or denies access to the memory portions also in dependence on the address of an instruction.

41. The integrated circuit according to claim 38, wherein the access control tables are hardwired so as to be unchangeable after manufacture of the integrated circuit.

* * * * *